Oct. 28, 1958 A. T. TYREE Re. 24,558
LAMINATED DOOR CONSTRUCTION
Original Filed Sept. 27, 1954 2 Sheets-Sheet 1
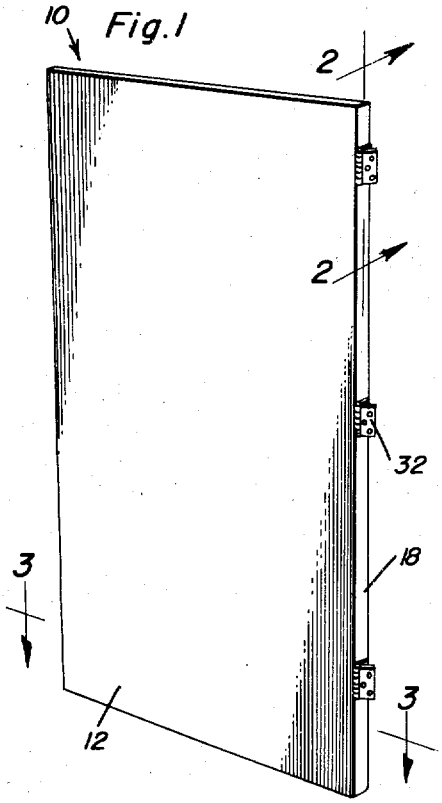
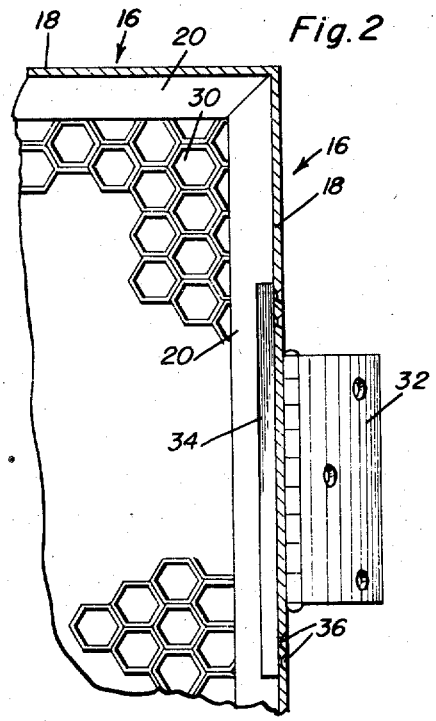
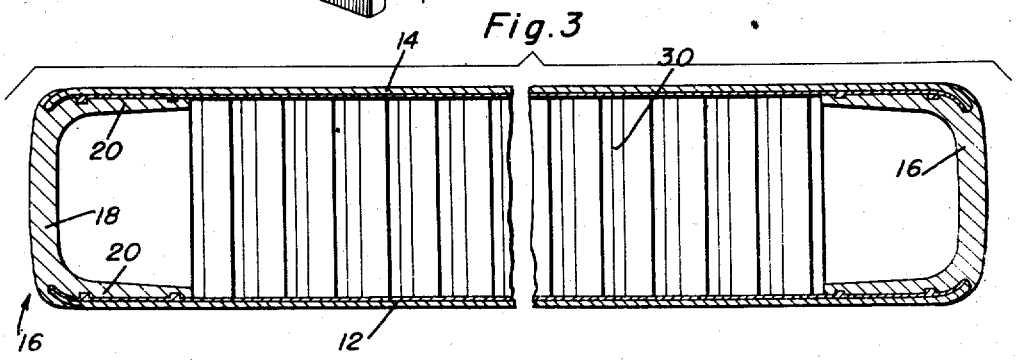
Andrew T. Tyree
INVENTOR.
BY Clarence A. O'Brien and Harvey B. Jacobson
Attorneys

LAMINATED DOOR CONSTRUCTION

Original Filed Sept. 27, 1954 2 Sheets-Sheet 2

Andrew T. Tyree
INVENTOR.

BY Clarence A. O'Brien and Harvey B. Jacobson
Attorneys

United States Patent Office

Re. 24,558
Reissued Oct. 28, 1958

24,558

LAMINATED DOOR CONSTRUCTION

Andrew T. Tyree, North Miami, Fla.

Original No. 2,765,056, dated October 2, 1956, Serial No. 458,502, September 27, 1954. Application for reissue August 19, 1957, Serial No. 679,795

7 Claims. (Cl. 189—46)

Matter enclosed in heavy brackets [ ] appears in the original patent but forms no part of this reissue specification; matter printed in italics indicates the additions made by reissue.

This invention comprises novel and useful improvements in a laminated door construction, and more specifically relates to a light weight but exceedingly strong laminated door having great heat insulating properties.

The principal object of this invention is to provide a door which may be inexpensively constructed of readily available and light weight materials and yet which shall have great strength accompanied by exceptionally good heat insulating properties.

Another fundamental object is to construct a door of great dimensional stability for resistance to warping, swelling in high humidity and during periods of great temperature fluctuations.

A further object of the invention is to provide a laminated door construction whereby an economical and commercially available insulating material of a honeycomb cellular-type may be directly bonded to the side panels of the door and to thereby strengthen the same.

Yet another object of the invention is-to provide an insulated door in which extremely thin light weight metallic material forming the panels of the two faces of the door shall be rigidly connected together by readily available metallic extruded elements.

A still further important object of the invention is to provide a door in conformity with the preceding objects and which may incorporate therein an opening through the door for receiving a jalousie or other member.

Yet another more specific object of the invention is to provide a light weight door including sheet metal front and back faces joined to extruded metallic spacing elements and in which the panels may be secured to the spacer elements in an advantageous manner.

These, together with other objects and advantages which will become subsequently apparent, reside in the details of construction and operation as more fully hereinafter described and claimed, reference being had to the accompanying drawings forming a part thereof, wherein like numerals refer to like parts throughout, and in which:

Figure 1 is a perspective view of one form of door construction in accordance with this invention, this form of door having an unbroken front and rear surface;

Figure 2 is a detailed view taken in vertical section upon an enlarged scale substantially upon the plane indicated by the section line 2—2 of Figure 1 and showing certain details of the manner in which a door hinge is secured to the door;

Figure 3 is a horizontal sectional view, parts broken away, taken upon an enlarged scale substantially upon the plane indicated by the section line 3—3 of Figure 1 and showing in particular the manner in which the front and rear door panels are attached to extruded metallic spacer members and the manner in which the insulating material is mounted between the door panels;

Figure 7:
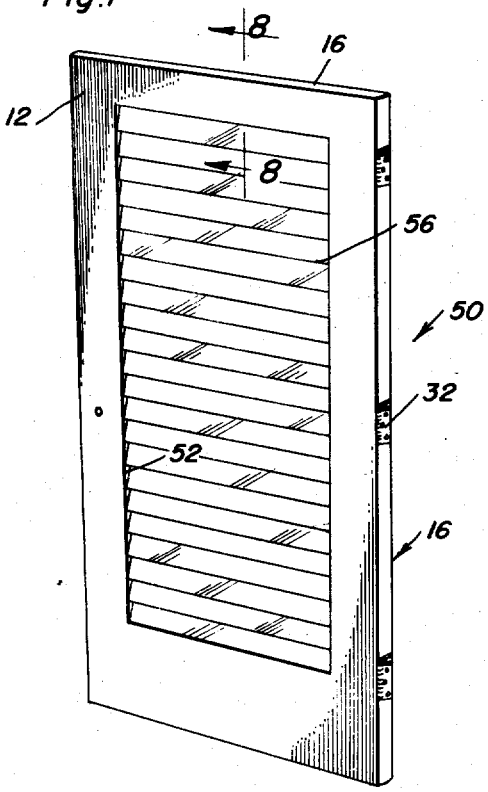
Figure 8:
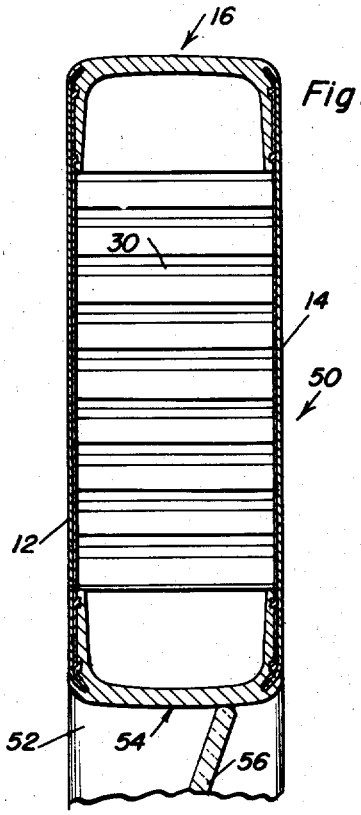

Figure 7 is a perspective view similar to Figure 1 but showing a different type of door that is provided with an opening for receiving a jalousie; and Figure 8 is a detailed view taken in vertical transverse section substantially upon the plane indicated by the section line 8—8 of Figure 7 but upon an enlarged scale and showing the manner in which the edges of the door panels are attached to the extruded spaced members in this type of door.

Reference is made first to Figures 1–6 for an understanding of the door construction in accordance with the principles of this invention. In this embodiment there is illustrated a door having imperforate or unbroken front and rear surfaces. In the embodiment of Figures 7 and 8, there is disclosed a similar door construction but one modified sufficiently to permit the provision of openings in the front and rear faces of the door whereby a jalousie or the like may be installed therein.

The door, illustrated generally by the numeral 10, as illustrated in the embodiment of Figures 1–6, includes front and rear panels 12 and 14 which are preferably of relatively thin light weight sheet material such as aluminum, stainless steel, plastics or the like. Interposed between the parallel front and rear panels of the door and serving as a combined separator or spacer as well as an attaching and supporting means for the panels is a single or a plurality of channel members 16 which are positioned between the adjacent edges of the door panels to form a framework between the same. The members 16 consist of channel members of U-shaped cross section or a single member notched at the corners, the same including a web portion 18 having side walls 20 in parallel relation at each end thereof. Since the channel members are of identical construction, it will be understood that the following description relative thereto is applicable to each of the channel members.

Upon the exterior surface of the side walls 20 of the channel members there are provided longitudinally extending recesses, troughs, pockets or grooves 22 (see Figures 4–6), the extruded channel member web portions 18 being initially formed with a lip 24 which extends beyond the exterior surface of the side walls 20. There are also provided a plurality of grooves or channels 26 in the side walls 20 on the exterior surface, two such grooves being shown for convenience of illustration although the invention may include any desired number of the same.

Figure 4:
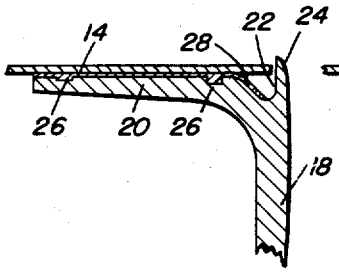
Figures 4–6 are detailed views in vertical section showing successive steps in the joining of the edges of the panels to the extruded spacer members of the door.
Figure 5:
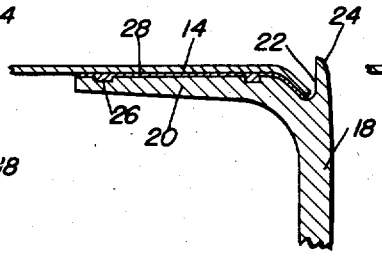
Figure 6:
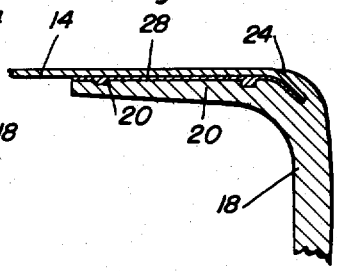

Disposed upon the exterior surface of the side walls 20 and deposited in the grooves or channels 26 and in the recess or pocket 22 is a layer of adhesive of any suitable character such as that indicated by the numerals 28. The interior surfaces of the panels 12 and 14 are placed upon the adhesive coating applied to the frame consisting of the channel member extrusions 16 with the edges of the panels being disposed in the recesses 22. This is the position indicated in Figure 4. Thereafter, the edges of the panels 14 and 12 are bent downwardly into the recess 22, as shown in Figure 5, and thereafter the lip 24 is swaged or bent inwardly to fold over the downturned end of the panel, thereby locking the same in place. It will be noted from Figure 6 which is the final step in the operation of securing the panels to the extrusion channel members, that the lip 24 is smoothly rounded and faired into the exterior surface of the panels. Although the downturned lip 24 may assist in mechanically securing the edges of the panels to the extrusion members, this is not relied upon primarily for that purpose. Instead, the adhesive coating applied between the panels and the exterior surface of the channel members serves to securely bond these members together.

As so far described, it will be apparent that there has been provided a hollow door construction consisting of a rim composed of extruded metallic channel members to which are secured the front and rear door panels by being bonded thereto with an adhesive, the extrusion channel members serving not only to secure the panels together, but to space them apart to provide a hollow chamber therebetween. Disposed in this hollow chamber is a body of heat insulating material 30. The insulating medium preferred for the purposes of this invention is a honeycombed cellular structure of fibre impregnated with a phenolic-type resin, now commercially available upon the market. This material is secured by the adhesive coating 28 which is also applied to the interior surfaces of the front and rear panels 14, whereby the insulating material is bonded and extends between these panels. The insulating material in its honeycombed cellular construction is of great strength and when bonded to the thin material of the front and rear panels serves to impart an extraordinary resistance to crushing or collapsing.

Door hinges 32 are secured to the web portions 18 of a vertically disposed edge of the door. For this purpose an anchor plate 34 is disposed on this inside surface of the web 18 with the hinge being disposed upon the interior surface of the web, the anchor strip being retained in place as by screws or rivets 36 passing through the web 18 into the anchor plate, while the hinge is secured to the web and anchor plate as by suitable rivets passing through these members or by bolts threaded into internally threaded bores in the anchor plate. Thus, the relatively thin material of the extruded channel members is reinforced and strengthened to receive the hinges.

In a similar manner, a lock, door knob, or other hardware may be attached to the other edge of the door to enable the latter to perform its desired functions.

Referring now to the modification of Figures 7 and 8, it will be understood that the same construction previously described is employed to form the entire door assembly. Here, however, the door having an opening for a jalouse, is indicated generally by the numeral 50, the opening receiving the jalousie being indicated at 52. In order to frame in this opening, there is provided in addition to the extruded channel members previously described which constitute the outer edge of the door, a second set of inner channel members of similar construction, each indicated by the numeral 54. The members 54 are identical with the members 16 and are disposed between the edges of the opening in the panels to thus close the space between the panels and provide a spacing and securing means therebetween. The front and rear panels 12 and 14 previously described are secured to the outer channel member 16 and to the inner channel members 54 in identically the same manner previously set forth, and the body of insulating material 30 is likewise secured between these members.

These is thus provided a light weight door of inexpensive construction relative to quality, metallic doors and which is ideally adapted for use with sheet metal construction such as automobile house-trailers, light weight prefabricated metal houses of various types and similar purposes. The door is so constructed that thin sheet metal panels may be secured together and reinforced by a body of insulating material therebetween as well as by extruded metallic channel members to which the insulating material and the panels are bonded, thus producing a laminated, light weight door construction. It will be understood that any suitable jalousie construction, indicated generally by the numeral 56, may be disposed in any desired manner in the opening 52 for obvious purposes.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A laminated closure construction comprising sheet metal front and back panels, channel members interposed between and spacing the corresponding edges of said panels, sandwich-type insulation of the honeycomb cellular-type disposed between and adhesively secured to said panels, said channel members being U-shaped in cross section and having a web with parallel legs, each leg of said channel members having upon its exterior surface grooves receiving the edges of said panels, a lip of each of said grooves being swaged upon said edges for smoothly fairing into said panels, said grooves at their inner portions being curved and extending into the webs.

2. A laminated closure construction comprising sheet metal front and back panels, metallic channel members of U-shaped cross section interposed between and spacing the corresponding edges of said panels, said channel members including a web with parallel legs, sandwich-type insulation of the honeycomb cellular-type disposed between and adhesively secured to said panels, said panels being secured to the legs of said channel members by an adhesive coating interposed therebetween.

3. The combination of claim 2 wherein the legs of said channel members include troughs upon their outer surfaces receiving said adhesive coating.

4. A laminated closure construction comprising sheet metal front and back panels, channel members of U-shaped cross section interposed between and spacing the corresponding edges of said panels, said channel members including a web with parallel legs, sandwich-type insulation of the honeycomb cellular-type disposed between and adhesively secured to said panels, hinges mounted upon the web of one of said channel members upon their exterior surface, anchor plates positioned in the interior surface of the web of said one channel member, fasteners securing said hinges to said anchor plates.

5. A laminated closure construction comprising sheet metal front and back panels, channel members of U-shaped cross section interposed between and spacing the corresponding edges of said panels and forming the outer edge of the frame of the door construction, sand wich-type insulation of the honeycomb cellular-type disposed between and adhesively secured to said panels, said panels having registering central openings, the edges of the panels surrounding the openings having a second set of channel members of U-shaped cross section interposed between and spacing the same and forming the rim of the opening and being secured to said panels.

*6. The combination of claim 2 wherein said channel member legs have grooves upon their exterior surfaces, said panels having edges received and retained in said grooves.*

*7. The combination of claim 2 wherein said channel member legs have grooves upon their exterior surfaces, said panels having edges received in said grooves, an adhesive material in said grooves engaging said edges.*

References Cited in the file of this patent or the original patent

UNITED STATES PATENTS

| | | |
|---|---|---|
| 1,473,320 | Ripper | Nov. 6, 1923 |
| 2,567,357 | Turner | Sept. 11, 1951 |
| 2,623,248 | Saunders | Dec. 30, 1952 |

OTHER REFERENCES

Publication entitled "Honeycomb Core Strutcures," Modern Plastics Magazine, pages 129–135, September 1946.